(12) United States Patent
Carlson et al.

(10) Patent No.: US 7,804,786 B2
(45) Date of Patent: Sep. 28, 2010

(54) METHOD AND APPARATUS FOR DETERMINING PATH LOSS BY COMBINING GEOLOCATION WITH INTERFERENCE SUPPRESSION

(75) Inventors: John Peter Carlson, Dulles, VA (US); John Arpee, Herndon, VA (US)

(73) Assignee: Andrew, LLC, Hickory, NC (US)

( * ) Notice: Subject to any disclaimer, the term of this patent is extended or adjusted under 35 U.S.C. 154(b) by 990 days.

(21) Appl. No.: 11/434,754

(22) Filed: May 17, 2006

(65) Prior Publication Data
US 2006/0262731 A1 Nov. 23, 2006

Related U.S. Application Data

(60) Provisional application No. 60/681,475, filed on May 17, 2005.

(51) Int. Cl.
*G01R 31/08* (2006.01)
(52) U.S. Cl. .................. 370/252; 370/222; 370/208
(58) Field of Classification Search ......... 370/200–253, 370/272–300, 431–546; 455/422, 422.1
See application file for complete search history.

(56) References Cited

U.S. PATENT DOCUMENTS

| | | | |
|---|---|---|---|
| 5,497,503 A | 3/1996 | Rydberg et al. | |
| 5,862,124 A | 1/1999 | Hottinen et al. | |
| 6,047,175 A | 4/2000 | Trompower | |
| 6,049,717 A | 4/2000 | Dufour et al. | |
| 6,138,024 A | 10/2000 | Evans et al. | |
| 6,236,365 B1 | 5/2001 | LeBlanc et al. | |
| 6,363,263 B1 | 3/2002 | Reudink et al. | |
| 6,480,522 B1 * | 11/2002 | Hoole et al. ................ | 375/130 |
| 6,526,279 B1 | 2/2003 | Dent | |
| 6,556,832 B1 | 4/2003 | Soliman | |
| 6,735,630 B1 * | 5/2004 | Gelvin et al. ................ | 709/224 |
| 6,845,240 B2 | 1/2005 | Carlson et al. | |
| 6,853,842 B1 | 2/2005 | Wilson et al. | |
| 2002/0009992 A1 * | 1/2002 | Jensen ........................ | 455/422 |
| 2002/0058503 A1 | 5/2002 | Gutowski | |
| 2003/0129987 A1 | 7/2003 | Tanay et al. | |

(Continued)

FOREIGN PATENT DOCUMENTS

EP 1191804 A2 3/2002

(Continued)

*Primary Examiner*—Ricky Ngo
*Assistant Examiner*—Iqbal Zaidi
(74) *Attorney, Agent, or Firm*—Duane Morris, LLP (57) ABSTRACT

The instant disclosure generally relates to a method and apparatus for determining path loss by combining geolocation with interference suppression. In one embodiment, the disclosure relates to a method for determining a path loss value between a receiver at a first location and a wireless mobile device at a second location. The method includes the steps of: (a) locating the mobile device at the second location and (b) at the receiver: (i) receiving a first signal transmitted by the mobile device at the second location; (ii) determining a received signal level of the first signal; (iii) receiving a second signal comprising data from which a transmitted signal level of the mobile device at the second location can be determined; and (iv) determining from the first and second signals the path loss value between the receiver and the mobile device at the second location.

53 Claims, 3 Drawing Sheets

U.S. PATENT DOCUMENTS

| | | | |
|---|---|---|---|
| 2004/0097223 A1* | 5/2004 | Bellec et al. | 455/422.1 |
| 2004/0137912 A1 | 7/2004 | Lin | |
| 2004/0244022 A1* | 12/2004 | Luo | 720/671 |

FOREIGN PATENT DOCUMENTS

| | | | |
|---|---|---|---|
| WO | 9927737 A1 | 6/1999 | |
| WO | 0213439 A2 | 2/2002 | |
| WO | 03001742 A1 | 1/2003 | |
| WO | WO03/102893 | * 12/2003 | |

* cited by examiner

METHOD AND APPARATUS FOR DETERMINING PATH LOSS BY COMBINING GEOLOCATION WITH INTERFERENCE SUPPRESSION

The disclosure claims the filing-date benefit of Provisional Application No. 60/681,475 filed May 17, 2005, the specification of which is incorporated herein in its entirety; the disclosure also relates to application entitled "Method and Apparatus for Determining Path Loss by Active Signal Detection" and application entitled "Method and Apparatus for Determining Coupled Path Loss" filed on simultaneously herewith and assigned to the assignee of the instant disclosure, the specification of each of said related application is incorporated herein in its entirety for background information.

BACKGROUND

Path loss is a measure of signal attenuation. Path loss is the difference between the transmitted signal power and the received signal power. Path loss has the units of Decibels (dB) and is a positive quantity which excludes the affects of the antenna gains. In its simplest form, path loss can be defined according to the free-space model of equation (1):

$$PL(dB) = P_t - P_r \qquad (1)$$

where PL denoted path loss, $P_t$ is the signal's transmitted power level and $P_r$ is the signal level recorded at the receiver, measured in units of decibels, such as dBm. Equation (1) assumes that there is no antenna gain at the transmitter and the receiver.

Path loss is least pronounced where a visible line of sight is available between the transmitter and the receiver where there is little or no electromagnetic interference. Electromagnetic interference is typically in the form of co-channel interference. Conversely, path loss is more pronounced as obstacles and electromagnetic sources interfere with signal propagation. Because path loss is a measure of signal attenuation, and therefore, bit error rate, it is an important tool in measuring quality of service throughout a wireless network.

In wireless networks, service quality across geographic areas is audited by conducting drive tests. In such tests, a transmitter is positioned at different locations to send a beacon signal. The transmitter's signal level and the location of the transmitter are recorded. The receivers then record the received signal level. Using the transmitted and received signal levels, path loss between the two locations can be computed.

The conventional testing method has several deficiencies. For example, the drive test is time consuming and inefficient. The drive test is usually also limited to locations that are easily accessible to drive test operators. Therefore, it is likely that not all network locations would be subject to the path loss study. Another problem is that the beacon signal maybe degraded by noise and interference such that the receiver cannot accurately measure the signals, therefore are limited in their ability to compute true path loss. Accurate assessments of path loss are important for determining the wireless coverage areas in a network, and provide the basis for performing wireless network optimization. Network optimization is a critical process used by network operators to maintain an acceptable balance between infrastructure costs, service quality, and network capacity. In theory, this balance is best achieved through continuous monitoring of the network performance in all areas of the wireless network, which is traditionally not a cost-effective option for network operators. The disclosed invention addresses this issue and offers a method in which wireless network operators can maximize the effectiveness of network optimization through accurate and efficient assessments of path loss. The efficiency aspect is achieved by utilizing the wireless users as autonomous test points, whose locations are computed by a location system. High accuracy measurements of path loss may be computed simultaneously by the location system and made available as a continuous source of data needed for network optimization.

SUMMARY

In one embodiment, the disclosure relates to a method for determining a path loss value between a receiver at a first location and a wireless mobile device at a second location, comprising the steps of: (a) geolocating the mobile device at the second location; and (b) at the receiver: (i) receiving a first signal transmitted by the mobile device at the second location; (ii) determining a received signal level of the first signal; (iii) receiving a second signal comprising data from which a transmitted signal level of the mobile device at the second location can be determined; and (iv) determining from the first and second signals the path loss value between the receiver and the mobile device at the second location.

In another embodiment, the disclosure relates to a method for determining a path loss value between a wireless mobile device at a first location and each of a plurality of receivers where each receiver is sited at a location different from the other receivers and different from the first location, comprising the steps of: (a) geolocating the mobile device at the first location; (b) at each of the plurality of receivers: (i) receiving a first signal transmitted by the mobile device at the first location; (ii) receiving a second signal comprising data from which a transmitted signal level of the mobile device at the second location can be determined; and (iii) sending to a central node a first reference signal representative of a signal attribute of the first signal; (c) determining at the central node a primary receiver and sending to the plurality of receivers a second reference signal representative of the first reference signal from the primary receiver; and (d) at each of the plurality of receivers determining from the first signal or the second reference signal the path loss value between the receiver and the mobile device at the first location.

In still another embodiment, the disclosure relates to a method for determining a path loss value between a wireless mobile device at a first location and each of a plurality of receivers where each receiver is sited at a location different from the other receivers and different from the first location, comprising the steps of: (a) at each of the plurality of receivers: (i) receiving a first signal transmitted by the mobile device at the first location; (ii) receiving a second signal comprising data from which a transmitted signal level of the mobile device at the second location can be determined; and (iii) sending to a central node a first reference signal representative of a signal attribute of the first signal; (b) at the central node: (i) receiving the first reference signals from the plurality of receivers; (ii) determining a primary receiver from the first reference signals; and (iii) sending to the plurality of receivers a second reference signal representative of the first reference signal from the primary receiver; (c) receiving at a wireless location sensor a third signal from the mobile device and determining the geolocation of the mobile device at the first location as a function of either an attribute of the third signal or information contained in the third signal; and (d) at each of the plurality of receivers: (i) receiving the second reference signal; (ii) determining from the third signal and the second reference signal the path loss value between the receiver and the mobile device at the first location.

In still another embodiment, the disclosure relates to a system for determining a path loss value between a receiver at a first location and a wireless mobile device at a second location. The system can comprise circuitry including a microprocessor for geolocating the mobile device at the second location; and a receiver comprising: first means for receiving a first signal transmitted by the mobile device at the second location; circuitry for determining a received signal level of the first signal; second means for receiving a second signal comprising data from which a transmitted signal level of the mobile device at the second location can be determined; and circuitry for determining from the first and second signals the path loss value between the receiver and the mobile device at the second location.

In another embodiment, the disclosure relates to a system for determining a path loss value between a wireless mobile device at a first location and each of a plurality of receivers where each receiver is sited at a location different from the other receivers and different from the first location, the system comprising: (a) circuitry including a microprocessor for locating the mobile device at the first location; (b) at least one of the plurality of receivers comprising: (i) means for receiving a first signal transmitted by the wireless mobile device at the first location; (ii) first circuitry for determining an attribute of the first signal; (iii) means for sending a first reference signal to a central node, the first reference signal representing the attribute of the first signal; (iv) means for receiving a second signal from the central node; (v) circuitry for determining the path loss value between the wireless mobile device and the receiver as a function of the location of the mobile device and the second signal; (c) the central node comprising: (i) means for selecting a primary receiver from the plurality of receivers as a function of the first reference signal; (ii) means for sending to each of the plurality of receivers the second signal representative of the first reference signal received from the primary receiver.

In still another embodiment, the disclosure relates to a system for determining a path loss value between a wireless mobile device at a first location and each of a plurality of receivers where each receiver is sited at a location different from the other receivers and different from the first location. The system comprises: (a) at least one of the plurality of receivers having (i) means for receiving a first signal transmitted by the wireless mobile device at the first location; (ii) first circuitry for determining an attribute of the first signal; (iii) means for sending a first reference signal to a central node, the first reference signal representing the attribute of the first signal; (iv) means for receiving a second reference signal from the central node; (v) circuitry for determining the path loss value between the wireless mobile device and the receiver as a function of the location of the mobile device and the second reference signal; (b) the central node comprising: (i) means for selecting a primary receiver from the plurality of receivers as a function of the first reference signal received from each receiver; (ii) means for sending to each of the plurality of receivers the second signal representative of the first reference signal received from the primary receiver; and (c) a location sensor comprising: (i) circuitry for determining the location of the wireless mobile device as a function of an attribute of a third signal received from the wireless mobile device; (ii) means for communicating the location of the wireless mobile device to at least one of the plurality of receivers.

BRIEF DESCRIPTION OF THE DRAWINGS

The principles of the disclosure will be discussed in relation with the exemplary and non-exclusive embodiments, in which.

DETAILED DESCRIPTION

Figure 1:
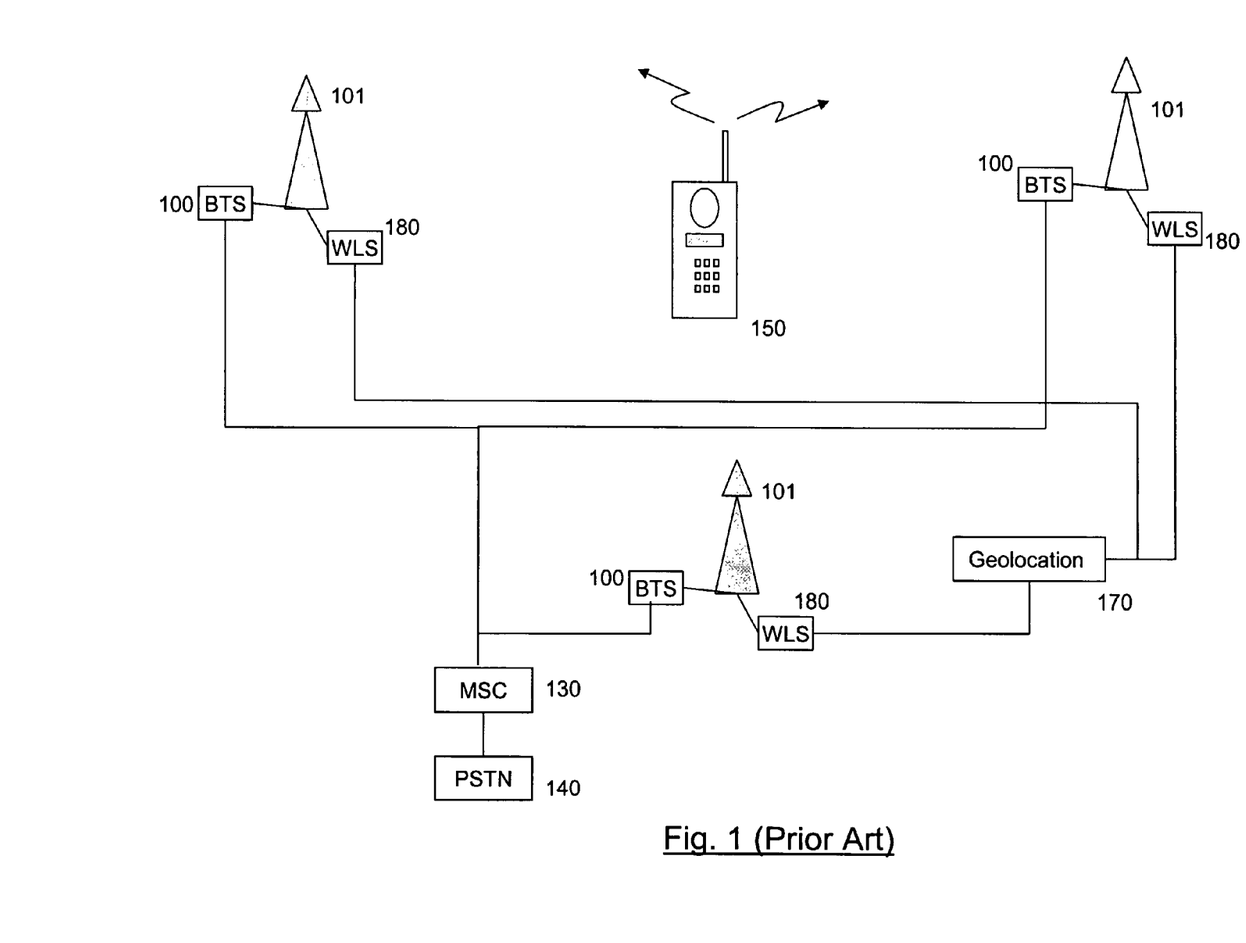
FIG. 1 is a schematic representation of a conventional gelocation system integrated with communication infrastructure.

FIG. 1 is a schematic representation of a conventional gelocation system integrated with communication infrastructure. Referring to FIG. 1, a typical prior art mobile communication system is depicted including three base stations 100 each with an associated antenna 101. The base stations are connected to a mobile switching center ("MSC") 130 which is an interface between the mobile communication system and the public switched telephone network ("PSTN") 140. The disclosed principles may operate in any mobile communication system with any number of base stations and are not limited to a system with three base stations as illustrated in FIG. 1.

The antennas transmit and receive communication and beacon signals to wireless mobile device 150. The mobile device can include, for example, wireless transmitter, radio frequency transmitter, mobile telephone, cellular or mobile telephone, text messaging device, portable computer, laptop computer, personal digital assistant, vehicle security device, vehicle tracking device, and pager.

A typical geolocation subsystem ("GLS") 170 interfaces with the cellular communication network to retrieve the identity of the user derived from standard base station equipment and the assigned channels. Conventional geolocation subsystems use this information for estimating the position of mobile device 150. It should be noted, however, that the disclosed inventive system and method for locating a mobile appliance can use a network overlay such that one or more wireless location sensors 180 (WLSs) receive a signal from the target mobile device (i.e., the mobile appliance for which the geolocation is to be determined) including a known sequence or sequences, and compute a location measurement based on an attribute or characteristics of the target mobile's signal. Such attributes may include, among others, time of arrival, angle of arrival ("TOA"), time difference of arrival ("TDOA"), received power level, etc. The disclosed system and method can equally operate with other such attributes of the mobile device's signal as are known in the art. The geolocation network overlay can be independent of the infrastructure or the wireless communication system. Also, the WLS and the associated antennas may be at different locations or co-located with the base station utilizing common towers or other shared components.

As stated, path loss is an important factor in determining the signal quality in a cellular system. Because path loss is often affected by noise, and interference from other channels, any accurate assessment of path loss must consider these factors. Thus, in accordance with one embodiment of the disclosure sufficient signal level measurements at a primary location are used to determine path loss at secondary locations which suffer from noise and interference.

Figure 2:
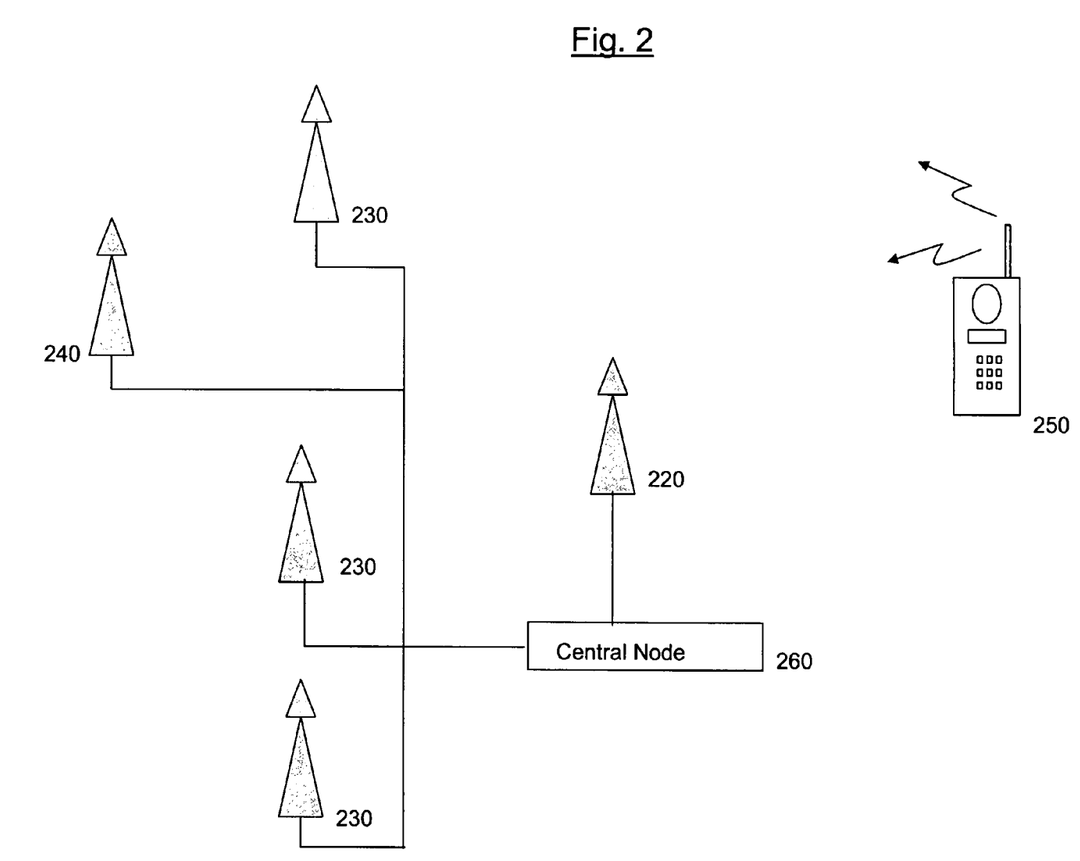
FIG. 2 is a schematic representation of an exemplary network for determining path loss according to one embodiment of the disclosure.

FIG. 2 is a schematic representation of an exemplary network for determining path loss according to one embodiment of the disclosure. In the network in FIG. 2, receivers 220, 230 and 240 are positioned to communicate with wireless mobile devise 250. Receivers 220, 230 and 240 may include antennas in communication with base stations, components of a geolocation system or both. Each receiver is configured to communicate with central node 260. Central node 260 may include a base station, a base station controller ("BSC"), an MSC, a PSTN or a circuitry adapted to perform the designated functions.

While not shown, a geolocation subsystem may be overlaid on, or incorporated, in the network of FIG. 2. In accordance with one embodiment of the disclosure, the network locates the mobile device using any conventional method. This step need not be implemented immediately and can be concurrent with the process.

Once the mobile device begins transmission, each receiver 220, 230 and 240 receives and identifies the beacon signal transmitted by mobile 250. Each receiver then communicates the received signal, or a sample thereof, to central node 260. Central node 260 identifies the signal of highest quality among the received signals and associates it with the receiver from which it was received. The signal quality can be quantified as a function of signal attributes. This signal is then used as a template or a reference signal and the receiver associated therewith is identified as a primary receiver.

In an alternative embodiment, each receiver may report an attribute of the received signal to the central node. The attribute of may include signal level (interchangeably, signal strength), bit error rate ("BER"), signal-to-noise ("SIR") ratio, signal-to-interference ("SIR") ratio, carrier-to-interference ("CIR") ratio and a combination of two or more thereof. The central node then compares the signal attribute from each receiver and selects a particular receiver as a primary receiver on the basis of its signal attributes.

In an exemplary embodiment where receiver 220 receives the strongest signal (or a signal having most favorable attributes) from mobile device 250, the central node of FIG. 2 identifies receiver 220 as the primary receiver and selects the signal received by the receiver 250 as the reference signal. Because the primary receiver typically has the least amount of noise and interference, its path loss is deemed to be least affected by such anomalies.

As noted, path loss is a function of the transmitted signal level and the received signal level. Conventionally, the mobile device reports its transmitted signal level on the reverse control channel communication. The received signal level is measured at an antenna (e.g., antenna 101 in FIG. 1) and recorded for path loss calculation. In an alternative embodiment, mobile 250 can report its transmit level power via a subsequent or second communication.

Central node 260 can then relay the reference signal (or an embodiment thereof) to each of the remaining receivers. Receivers 230 and 240 (secondary receivers) use the reference signal to identify the mobile's signal from among the received noise and interference. In other words, using the reference signal as a template, the secondary receivers can identify the mobile's signal and calculate its path loss. The path loss calculated by each receiver can be compiled at a local database or forwarded to a central database.

In an alternative embodiment, the central node uses the reference signal from the primary receiver to construct a second reference signal therefrom. The second reference signal is then transmitted to the secondary receivers to be used as a template. In still another embodiment, the step of identifying the reference signal is implemented at, and among, the receivers without involving the central node.

As stated, the path loss results can be stored locally or transmitted to a central database for further processing and storage. The steps described above can be repeated for different mobile devices located at different locations throughout the cellular networks. The result is a cumulative database of path loss information throughout the network. In a network where the location of each mobile device is readily available, the disclosed system can result in the accumulation of a substantial path loss database. The data can be updated as more path loss data becomes available from each transmission location. Additional mathematical algorithms can be used to quantify the path loss value for a given location where a plurality of path loss value have been reported. Moreover, because the path loss determination relies on the mobile device, as opposed to a drive test, the data can include path loss values at different altitude, for example, at floors levels of a building.

In one embodiment of the disclosure, the step of geolocating the mobile device is implemented with the aid of a GPS system. In such systems the mobile device may include a GPS circuitry configured to assess the mobile's location based on navigation data received from satellites. The mobile device can report its location to the base station or to the WLS network which will take into account the mobile device's location while compiling path loss data.

In another embodiment, the step of geolocating the mobile device includes receiving a signal from the mobile device at one ore more WLS and using the AOA, TDOA or a combination of these methods to calculate the mobile device's location. In evaluating the location of the mobile, the network can also take into account the secondary attribute (or characteristic) of the signal such as signal strength, signal to noise ratio, bit error rate and received power level. It should be noted that the signal used by the WLS can be the same signal that is used by receivers 220, 230 and 240 for path loss calculation. In an embodiment where a geolocation subsystem is unavailable, the receivers can use the same signal to determine both the location of the mobile and path loss at said location.

Figure 3:
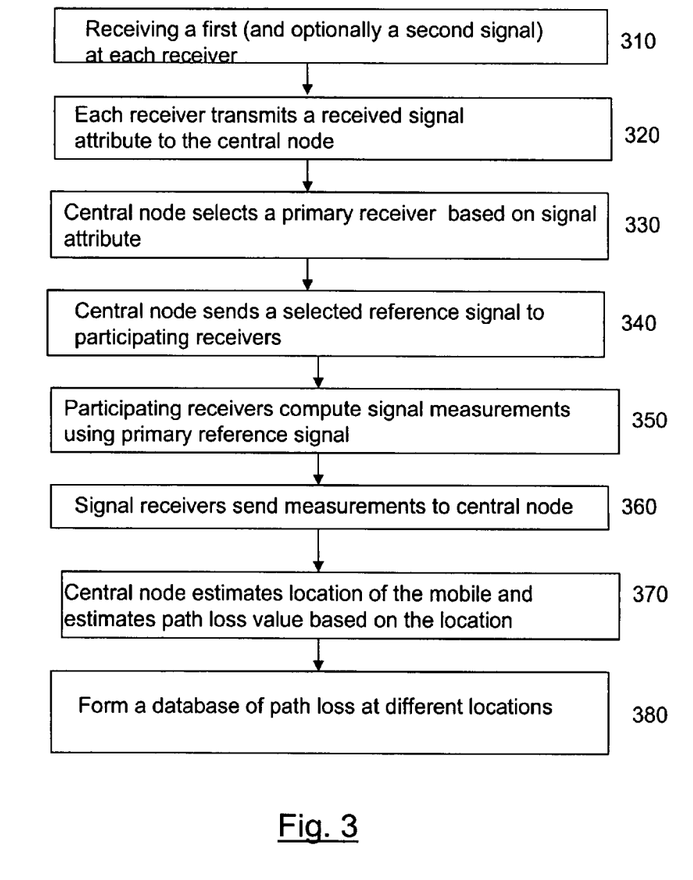
FIG. 3 is a schematic representation of an exemplary algorithm for determining path loss according to one embodiment of the disclosure.

FIG. 3 is a schematic representation of an exemplary algorithm for determining path loss according to one embodiment of the disclosure. In step 310 of FIG. 3, each of a plurality of receivers registers a first signal transmitted by the mobile device from the first location. Each receiver may also receive a second signal reporting the transmitted signal level of the mobile device if the same is not reported in the first signal. The receiver can either store the signal level information or report the information to the central node along with its reference signal.

In step 320, each receivers transmits one or more of the received signal attributes to the central node (or a central processor). In an alternative embodiment, each receiver can transmit the received signal or a digital representation of the signal to the central node. In step 330, the central node compares the quality of the reference signals from each receiver and selects a primary receiver based on the signal attributes communicated in step 320. The receiver with the highest signal attributes can be designated as the primary receiver while the remaining receivers can be identified as secondary receivers. The reference signal can be a digital representation of the signal attribute of the signal received from the primary receiver. In another embodiment, the reference signal can be a digital representation of the signal received from the primary receiver.

In step 340, the central node sends a selected reference signal to the secondary receivers. In step 350, the selected reference signal is used by the secondary receivers to compute signal measurements from the mobile device. The reference signal at the receiver can aid in boosting the mobile's received signal level by as much as 20 dB. Once the measurements are completed at each receiver, the receivers send their respective measurements to the central node (step 360.)

In step 370, the central node estimates location of the mobile device as well as the path loss value based on the location. In an embodiment where the mobile device has GPS capability, the mobile may communicate its location to the various receivers. In this manner, the signal received by the receivers may contain the geolocation information. Alternatively, the mobile device may communicate its location to the central node or to a primary receiver and the latter devices could relay the location information to the remaining receivers. In an embodiment where a geolocation subsystem is incorporated into the network, one or more WLSs can determine the location of the mobile by receiving and analyzing one more signal attributes from the mobile. As stated, conventional method such as AOA or TDOA can be used to detect the location of the mobile device.

By repeating these steps for a number of mobile devices throughout the network a comprehensive database of path loss throughout the network can be devised (step 380). The database can be used to, among others, assess quality of service throughout the network.

An exemplary system according to one embodiment of the disclosure can include a circuitry for determining the location of the mobile device. The circuitry can include one or more microprocessor programmed with appropriate algorithms to determine location of the mobile device. In one embodiment, the algorithm is configured to work with GPS satellites to determine mobile device's location. In another implementation, the circuitry is provided at a WLS site, at a base station or at a different location. According to this embodiment, the circuitry can be programmed to determine the location of the mobile device based on signal attributes including AOA, TDOA, signal strength, signal to noise ratio, bit error rate and the received power level. In this manner, the circuitry collects signal attributes from several sites and determines the location of the mobile device.

The system can also include one or more receivers. Each receiver can act as a radio receiver, a transceiver, a base station, a WLS or a combination thereof. Accordingly, a receiver can include the appropriate circuits for receiving a signal transmitted by the mobile device, assessing the received signal power and either determining the location of the mobile device or receiving geolocation data indicating the mobile's location. The same or additional circuitry can be used to determine the path loss value of the signal as a function of the reported transmission and the received signal power levels.

The system can also include one or more memory circuits for storing the path loss data. The database can have any conventional form and can be accessible to the network managers and/or authorized individuals.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for determining a path loss value between a receiver at a first location and a wireless mobile device at a second location, the receiver being one of a plurality of receivers where each receiver is sited at a location different from the other receivers and from the second location, comprising the steps of:

geolocating the mobile device at the second location; and
at the receiver, the receiver being at the first location:
  receiving a first signal transmitted by the mobile device at the second location;
  determining a received signal level of the first signal; and
  receiving a second signal transmitted by the mobile device at the second location, the second signal comprising data from which a transmitted signal attribute of the mobile device at the second location can be determined;
sending to a central node a first reference signal representative of the transmitted signal attribute;
determining at the central node a primary receiver from the plurality of receivers and sending to the primary receiver a second reference signal representative of the first reference signal from the receiver at the first location; and
determining from the received signal level of the first signal and from the second reference signal the path loss value between the primary receiver and the mobile device at the second location.

2. The method of claim 1 wherein the mobile device is selected from the group consisting of: wireless transmitter, radio frequency transmitter, mobile telephone, cellular phone, text messaging device, portable computer, laptop computer, personal digital assistant, vehicle security device, vehicle tracking device, and pager.

3. The method of claim 1 wherein each step is repeated for the mobile device located at each of a plurality of different locations.

4. The method of claim 3 wherein the path loss values for each of the plurality of different locations are stored in a database.

5. The method of claim 1 wherein the first signal and the second signal are the same.

6. The method of claim 1 wherein the step of geolocating the mobile device includes receiving at a wireless location sensor a third signal from the mobile device.

7. The method of claim 6 wherein the step of geolocating the mobile device includes determining an angle of arrival of the third signal at the wireless location sensor.

8. The method of claim 6 wherein the step of geolocating the mobile device includes determining a time of arrival of the third signal at the wireless location sensor.

9. The method of claim 6 wherein the step of geolocating the mobile device includes determining a characteristic of the third signal at the wireless location sensor wherein the characteristic is selected from the group consisting of: signal strength, signal to noise ratio, bit error rate, and received power level.

10. The method of claim 6 wherein the wireless location sensor is a plurality of wireless location sensors each sited at a location unique among the other wireless location sensors.

11. The method of claim 6 wherein at least two of the first, second, and third signals are the same.

12. The method of claim 1 wherein the signal attribute is selected from the group consisting of comprises signal level, bit error rate ("BER"), signal-to-noise ("SIR") ratio, signal-to-interface ("SIR") ratio, And a combination of two or more thereof.

13. A method for determining a path loss value between a wireless mobile device at a first location and each of a plurality of receivers where each receiver is sited at a location different from the other receivers and different from the first location, comprising the steps of:
geolocating the mobile device at the first location;
at each of the plurality of receivers:
receiving a first signal transmitted by the mobile device at the first location;
receiving a second signal transmitted by the mobile device at the first location, the second signal comprising data from which a transmitted signal attribute of the mobile device at the first location can be determined; and
sending to a central node a first reference signal representative of a signal attribute of the first signal;
determining at the central node a primary receiver and sending to the plurality of receivers a second reference signal representative of the first reference signal from the primary receiver; and
at each of the plurality of receivers determining from a received signal level of the first signal or from the second reference signal the path loss value between the receiver and the mobile device at the first location.

14. The method of claim 13 wherein the mobile device is selected from the group consisting of: wireless transmitter, radio frequency transmitter, mobile telephone, cellular phone, text messaging device, portable computer, laptop computer, personal digital assistant, vehicle security device, vehicle tracking device, and pager.

15. The method of claim 13 wherein each step is repeated for the mobile device located at each of a plurality of different locations.

16. The method of claim 15 wherein the path loss values for each of the plurality of different locations are stored in a database.

17. The method of claim 13 wherein the first signal and the second signal are the same.

18. The method of claim 13 wherein the step of geolocating the mobile device includes receiving at a wireless location sensor a third signal from the mobile device.

19. The method of claim 18 wherein the step of geolocating the mobile device includes determining an angle of arrival of the third signal at the wireless location sensor.

20. The method of claim 18 wherein the step of geolocating the mobile device includes determining a time of arrival of the third signal at the wireless location sensor.

21. The method of claim 18 wherein the step of geolocating the mobile device includes determining a characteristic of the third signal at the wireless location sensor wherein the characteristic is selected from the group consisting of: signal strength, signal to noise ratio, bit error rate, and received power level.

22. The method of claim 18 wherein the wireless location sensor is a plurality of wireless location sensors each sited at a location unique among the other wireless location sensors.

23. The method of claim 18 wherein at least two of the first, second, and third signals are the same.

24. The method of claim 18 wherein the signal attribute is selected from the group consisting of comprises signal level, bit error rate ("BER"), signal-to-noise ("SIR") ratio, signal-to-interference ("SIR") ratio, and a combination of two or more thereof.

25. The method of claim 18 wherein the central node is co-located with one of the receivers.

26. A method for determining a path loss value between a wireless mobile device at a first location and each of a plurality of receivers where each receiver is sited at a location different from the other receivers and different from the first location, comprising the steps of:
at each of the plurality of receivers:
receiving a first signal transmitted by the mobile device at the first location;
receiving a second signal transmitted by the mobile device at the first location, the second signal comprising data from which a transmitted first signal attribute of the mobile device at the first location can be determined; and
sending to a central node a first reference signal representative of a first signal attribute of the first signal; at the central node:
receiving the first reference signals from the plurality of receivers;
determining a primary receiver from the first reference signals; and
sending to the plurality of receivers a second reference signal representative of the first reference signal from the primary receiver;
receiving at a wireless location sensor a third signal from the mobile device and determining the geolocation of the mobile device at the first location as a function of either a second attribute of the third signal or information contained in the third signal; and
at each of the plurality of receivers:
receiving the second reference signal;
determining from a signal level of the third signal and from the second reference signal the path loss value between the receiver and the mobile device at the first location.

27. The method of claim 26 wherein the mobile device is selected from the group consisting of: wireless transmitter, radio frequency transmitter, mobile telephone, cellular phone, text messaging device, portable computer, laptop computer, personal digital assistant, vehicle security device, vehicle tracking device, and pager.

28. The method of claim 26 wherein each step is repeated for the mobile device located at each of a plurality of different locations.

29. The method of claim 28 wherein the path loss values for each of the plurality of different locations are stored in a database.

30. The method of claim 26 wherein the first signal and the second signal are the same.

31. The method of claim 26 wherein a second attribute of the third signal is selected from the group consisting of: angle of arrival, time of arrival, signal strength, time difference of arrival and received power level.

32. The method of claim 26 wherein the wireless location sensor is a plurality of wireless location sensors each sited at a location unique among the other wireless location sensors.

33. The method of claim 26 wherein at least two of the first, second, and third signals are the same.

34. The method of claim 26 wherein the first signal attribute is selected from the group consisting of comprises signal level, bit error rate ("BER"), signal-to-noise ("SIR") ratio, signal-to-interference ("SIR") ratio, and a combination of two or more thereof.

35. The method of claim 26 wherein the central node is co-located with one of the receivers.

36. A system for determining a path loss value between a wireless mobile device at a first location and each of a plurality of receivers where each receiver is sited at a location different from the other receivers and different from the first location, the system comprising:
- circuitry including a microprocessor for locating the mobile device at the first location;
- at least one of the plurality of receivers comprising:
  - means for receiving a first signal transmitted by the wireless mobile device at the first location;
  - first circuitry for determining an attribute of the first signal;
  - means for sending a first reference signal to a central node,
  - the first reference signal representing the attribute of the first signal;
  - means for receiving a second signal from the central node;
  - circuitry for determining the path loss value between the wireless mobile device and the receiver as a function of the location of the mobile device and a signal level of the second signal; the central node comprising:
  - means for selecting a primary receiver from the plurality of receivers as a function of the first reference signal;
  - means for sending to each of the plurality of receivers the second signal representative of the first reference signal received from the primary receiver.

37. The system of claim 36 wherein the wireless mobile device is selected from the group consisting of: wireless transmitter, radio frequency transmitter, mobile telephone, cellular phone, text messaging device, portable computer, laptop computer, personal digital assistant, vehicle security device, vehicle tracking device, and pager.

38. The system of claim 36 further comprising memory means for storing the path loss value.

39. The system of claim 36 wherein the first signal and the second signal are the same.

40. The system of claim 36 further comprising a wireless location sensor for receiving a third signal from the mobile device.

41. The system of claim 40 wherein at least two of the first signal, the first reference signal and the second signal are substantially similar.

42. The system of claim 36 wherein the circuitry for locating the mobile device at the first location comprises a geo-positioning system ("GPS").

43. The system of claim 36 wherein the circuitry for locating the mobile device at the first location comprises a wireless location sensor ("WLS").

44. The system of claim 36, wherein the attribute of the first signal is selected from the group consisting of comprises signal level, bit error rate ("BER"), signal-to-noise ("SIR") ratio, signal-to-interference ("SIR") ratio, and a combination of two or more thereof.

45. A system for determining a path loss value between a wireless mobile device at a first location and each of a plurality of receivers where each receiver is sited at a location different from the other receivers and different from the first location, the system comprising:
- at least one of the plurality of receivers comprising: means for receiving a first signal transmitted by the wireless mobile device at the first location;
  - first circuitry for determining an attribute of the first signal;
  - means for sending a first reference signal to a central node,
- the first reference signal representing the attribute of the first signal;
  - means for receiving a second reference signal from the central node;
  - circuitry for determining the path loss value between the wireless mobile device and the receiver as a function of the location of the mobile device and the second reference signal; the central node comprising:
  - means for selecting a primary receiver from the plurality of receivers as a function of the first reference signal received from each receiver;
  - means for sending to each of the plurality of receivers the second signal representative of the first reference signal received from the primary receiver;
- a location sensor comprising:
  - circuitry for determining the location of the wireless mobile device as a function of an attribute of a third signal received from the wireless mobile device;
  - means for communicating the location of the wireless mobile device to at least one of the plurality of receivers.

46. The system of claim 45 wherein the attribute of the first signal is selected from the group consisting of comprises signal level, bit error rate ("BER"), signal-to-noise ("SIR") ratio, signal-to-interference ("SIR") ratio, and a combination of two or more thereof.

47. The system of claim 45 further comprising memory means for storing the path loss value.

48. The system of claim 45 wherein the first signal and the second signal are the same.

49. The system of claim 45 further comprising a wireless location sensor for receiving a third signal from the mobile device.

50. The system of claim 45 wherein at least two of the first signal, the first reference signal and the second signal are substantially similar.

51. The system of claim 45 wherein the circuitry for locating the mobile device at the first location comprises a geo-positioning system ("GPS").

52. The system of claim 45 wherein the circuitry for locating the mobile device at the first location comprises a wireless location sensor ("WLS").

53. The system of claim 45 wherein the attribute of the third signal is selected from the group consisting of: angle of arrival, time of arrival, signal strength, signal to noise ratio, bit error rate and received power level.

* * * * *